(12) United States Patent
Gubbi

(10) Patent No.: US 6,888,818 B1
(45) Date of Patent: May 3, 2005

(54) PROTOCOL EXTENSION SCHEME FOR WIRELESS COMPUTER NETWORKS

(75) Inventor: Rajugopal R. Gubbi, Fair Oaks, CA (US)

(73) Assignee: Share Wave, Inc., El Dorado Hills, CA (US)

(*) Notice: Subject to any disclaimer, the term of this patent is extended or adjusted under 35 U.S.C. 154(b) by 0 days.

(21) Appl. No.: 09/293,492

(22) Filed: Apr. 15, 1999

(51) Int. Cl.[7] .................................. H04J 3/24
(52) U.S. Cl. .................. 370/349; 370/465; 370/471
(58) Field of Search .......................... 370/389, 392, 370/338, 349, 352–356, 364, 365, 366, 470, 471, 472, 473

(56) References Cited

U.S. PATENT DOCUMENTS

| | | | |
|---|---|---|---|
| 5,012,470 A | | 4/1991 | Shobu et al. |
| 5,570,365 A | * | 10/1996 | Yoshida ............... 370/389 |
| 5,680,585 A | | 10/1997 | Bruell |
| 5,930,451 A | * | 7/1999 | Ejiri ............... 386/98 |
| 6,075,798 A | * | 6/2000 | Lyons et al. ............... 370/474 |
| 6,141,788 A | * | 10/2000 | Rosenberg et al. ......... 714/774 |

FOREIGN PATENT DOCUMENTS

EP  0627835 A1  6/1993

OTHER PUBLICATIONS

PCT, Search Report, Sep. 25, 2000.

* cited by examiner

*Primary Examiner*—Ajit Patel
(74) *Attorney, Agent, or Firm*—Thompson & Knight LLP; James J. Murphy

(57) ABSTRACT

A packet header for use in information packets transmitted within a computer network includes a protocol extension field that indicates changes of field values and/or lengths within the header. In one embodiment, the protocol extension field includes two bits. The value of the protocol extension field indicates whether or not the packet header has been altered: 00 indicates no alterations, 01 or 10 indicate a predetermined change in the content and/or length of the header, and 11 indicates dynamic negotiation of the field values and/or size. Such packets may be used in a communication protocol for the computer network.

17 Claims, 4 Drawing Sheets

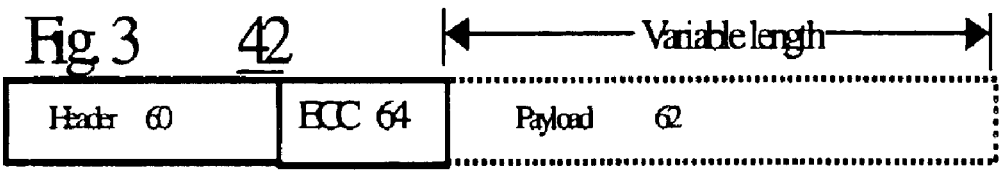
Fig. 3
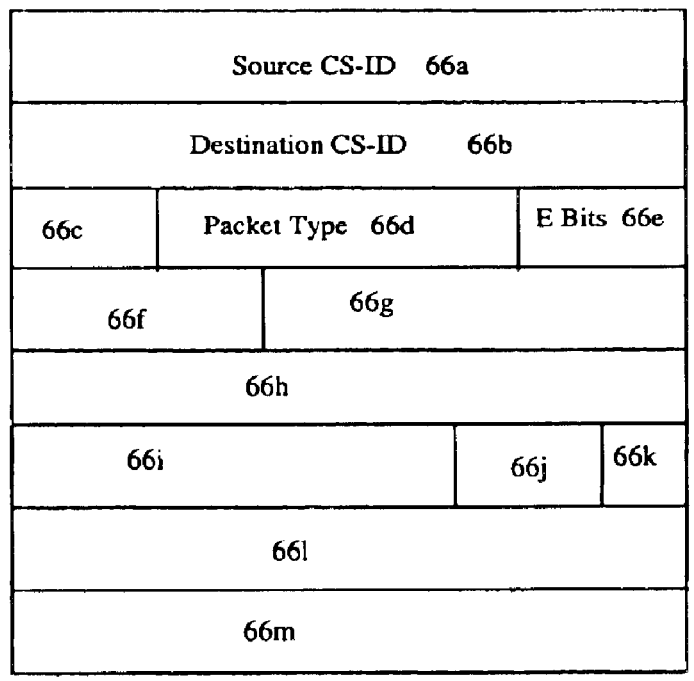
60    Fig. 4

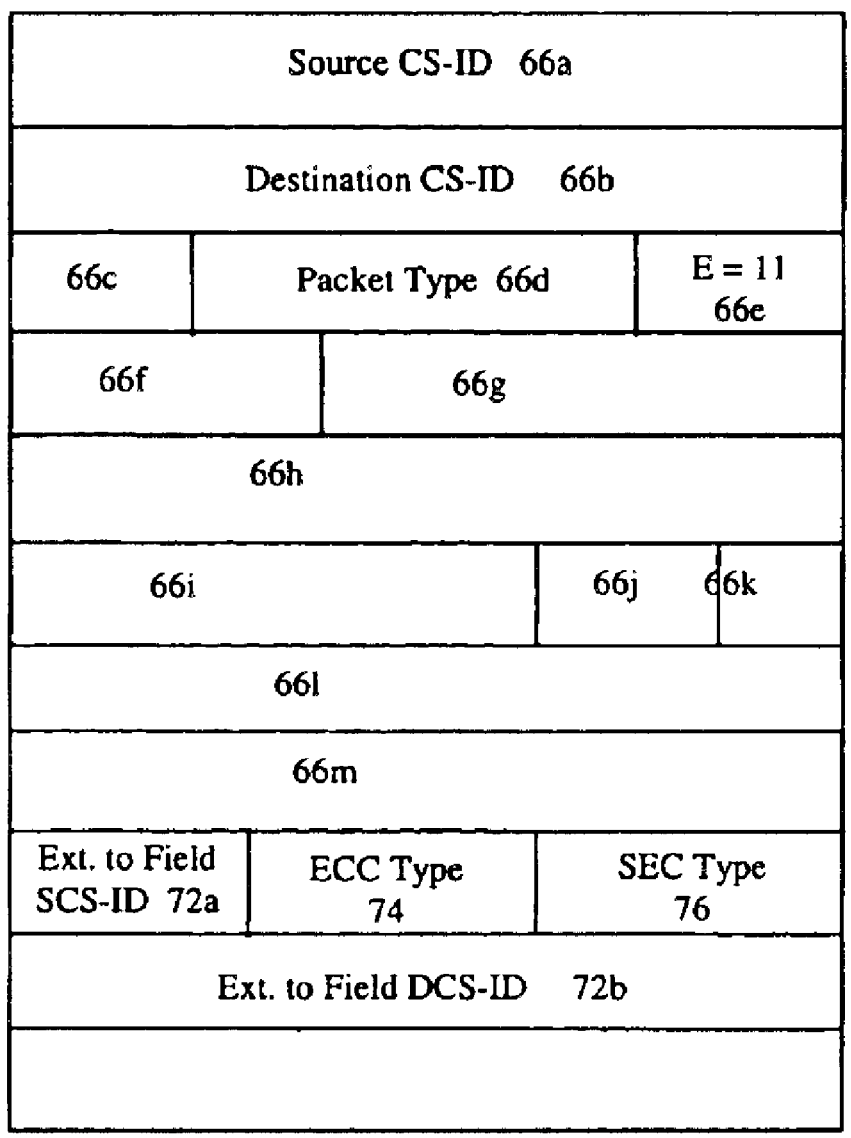
Fig. 5    70

PROTOCOL EXTENSION SCHEME FOR WIRELESS COMPUTER NETWORKS

CROSS REFERENCE TO RELATED APPLICATIONS

This application for patent is a continuation of the following applications for patent:

Currently pending U.S. application Ser. No. 09/293,492, filed Apr. 15, 1999 by inventor Gubbi, entitled Protocol Extension Scheme For Wireless Computer.

FIELD OF THE INVENTION

The present invention relates generally to communications in a computer network and, in particular, to a method for extending protocol capabilities within such a network using specialized packet header information.

BACKGROUND

In the above-referenced co-pending application Ser. No. 09/151,452, which is incorporated herein by reference, a computer network adapted for use in the home environment was described. That architecture included a number of network components arranged in a hierarchical fashion and communicatively coupled to one another through communication links operative at different levels of the hierarchy. At the highest level of the hierarchy, a communication protocol that supports dynamic addition of new network components at any level of the hierarchy according to bandwidth requirements within a communication channel operative at the highest level of the network hierarchy is used. Preferably, the communication channel is supported on a wireless communication link.

The generalization of this network structure is shown in FIG. 1. A subnet 10 includes a server 12. In this scheme, the term "subnet" is used describe a cluster of network components that includes a server and several clients associated therewith (e.g., coupled through the wireless communication link). Depending on the context of the discussion however, a subnet may also refer to a network that includes a client and one or more subclients associated therewith. A "client" is a network node linked to the server through the wireless communication link. Examples of clients include audio/video equipment such as televisions, stereo components, personal computers, satellite television receivers, cable television distribution nodes, and other household appliances.

Server 12 may be a separate computer that controls the communication link, however, in other cases server 12 may be embodied as an add-on card or other component attached to a host computer (e.g., a personal computer) 13. Server 12 has an associated radio 14, which is used to couple server 12 wirelessly to the other nodes of subnet 10. The wireless link generally supports both high and low bandwidth data channels and a command channel. Here a channel is defined as the combination of a transmission frequency (more properly a transmission frequency band) and a pseudo-random (PN) code used in a spread spectrum communication scheme. In general, a number of available frequencies and PN codes may provide a number of available channels within subnet 10. As is described in the co-pending application cited above, servers and clients are capable of searching through the available channels to find a desirable channel over which to communicate with one another.

Also included in subnet 10 are a number of clients 16, some of which have shadow clients 18 associated therewith. A shadow client 18 is defined as a client which receives the same data input as its associated client 16 (either from server 12 or another client 16), but which exchanges commands with server 12 independently of its associated client 16. Each client 16 has an associated radio 14, which is used to communicate with server 12, and some clients 16 may have associated subclients 20. Subclients 20 may include keyboards, joysticks, remote control devices, multi-dimensional input devices, cursor control devices, display units and/or other input and/or output devices associated with a particular client 16. A client 16 and its associated subclients 20 may communicate with one another via communication links 21, which may be wireless (e.g., infra-red, ultrasonic, spread spectrum, etc.) communication links.

Each subnet 10 is arranged in a hierarchical fashion with various levels of the hierarchy corresponding to levels at which intra-network component communication occurs. At a highest level of the hierarchy exists the server 12 (and/or its associated host 13), which communicates with various clients 16 via the wireless radio channel. At other, lower levels of the hierarchy the clients 16 communicate with their various subclients 20 using, for example, wired communication links or wireless communication links such as infra-red links.

Where half-duplex radio communication is used on the wireless link between server 12 and clients 16, a communication protocol based on a slotted link structure with dynamic slot assignment is employed. Such a structure supports point-to-point connections within subnet 10 and slot sizes may be re-negotiated within a session. Thus a data link layer that supports the wireless communication can accommodate data packet handling, time management for packet transmission and slot synchronization, error correction coding (ECC), channel parameter measurement and channel switching. A higher level transport layer provides all necessary connection related services, policing for bandwidth utilization, low bandwidth data handling, data broadcast and, optionally, data encryption. The transport layer also allocates bandwidth to each client 16, continuously polices any under or over utilization of that bandwidth, and also accommodates any bandwidth renegotiations, as may be required whenever a new client 16 comes on-line or when one of the clients 16 (or an associated subclient 20) requires greater bandwidth.

The slotted link structure of the wireless communication protocol for the transmission of real time, multimedia data (e.g., as frames) within a subnet 10 is shown in FIG. 2. At the highest level within a channel, forward (F) and backward or reverse (B) slots of fixed (but negotiable) time duration are provided within each frame transmission period. During forward time slots F, server 12 may transmit video and/or audio data and/or commands to clients 16, which are placed in a listening mode. During reverse time slots B, server 12 listens to transmissions from the clients 16. Such transmissions may include audio, video or other data and/or commands from a client 16 or an associated subclient 20. At the second level of the hierarchy, each transmission slot (forward or reverse) is made up of one or more radio data frames 40 of variable length. Finally, at the lowest level of the hierarchy, each radio data frame 40 is comprised of server/client data packets 42, which may be of variable length.

Each radio data frame 40 is made up of one server/client data packet 42 and its associated error correction coding (ECC) bits. The ECC bits may be used to simplify the detection of the beginning and ending of data packets at the receive side. Variable length framing is preferred D over constant length framing in order to allow smaller frame lengths during severe channel conditions and vice-versa. This adds to channel robustness and bandwidth savings. Although variable length frames may be used, however, the ECC block lengths are preferably fixed. Hence, whenever the data packet length is less than the ECC block length, the ECC block may be truncated (e.g., using conventional virtual zero techniques). Similar procedures may be adopted for the last block of ECC bits when the data packet is larger.

As shown in the illustration, each radio data frame 40 includes a preamble 44, which is used to synchronize pseudo-random (PN) generators of the transmitter and the receiver. Link ID 46 is a field of fixed length (e.g., 16 bits long for one embodiment), and is unique to the link, thus identifying a particular subnet 10. Data from the server 12/client 16 is of variable length as indicated by a length field 48. Cyclic redundancy check (CRC) bits 50 may be used for error detection/correction in the conventional fashion.

For the illustrated embodiment then, each frame 52 is divided into a forward slot F, a backward slot B, a quiet slot Q and a number of radio turn around slots T. Slot F is meant for server 12-to-clients 16 communication. Slot B is time shared among a number of mini-slots $B_1$, $B_2$, etc., which are assigned by server 12 to the individual clients 16 for their respective transmissions to the server 12. Each mini-slot $B_1$, $B_2$, etc. includes a time for transmitting audio, video, voice, lossy data (i.e., data that may be encoded/decoded using lossy techniques or that can tolerate the loss of some packets during transmission/reception), lossless data (i.e., data that is encoded/decoded using lossless techniques or that cannot tolerate the loss of any packets during transmission/ reception), low bandwidth data and/or command (Cmd.) packets. Slot Q is left quiet so that a new client may insert a request packet when the new client seeks to log-in to the subnet 10. Slots T appear between any change from transmit to receive and vice-versa, and are meant to accommodate individual radios turn around time (i.e., the time when a half-duplex radio 14 switches from transmit to receive operation or vice-versa). The time duration of each of these slots and mini-slots may be dynamically altered through renegotiations between the server 12 and the clients 16 so as to achieve the best possible bandwidth utilization for the channel. Note that where full duplex radios are employed, each directional slot (i.e., F and B) may be full-time in one direction, with no radio turn around slots required.

Forward and backward bandwidth allocation depends on the data handled by the clients 16. If a client 16 is a video consumer, for example a television, then a large forward bandwidth is allocated for that client. Similarly if a client 16 is a video generator, for example a video camcorder, then a large reverse bandwidth is allocated to that particular client. The server 12 maintains a dynamic table (e.g., in memory at server 12 or host 13), which includes forward and backward bandwidth requirements of all on-line clients 16. This information may be used when determining whether a new connection may be granted to a new client. For example, if a new client 16 requires more than the available bandwidth in either direction, server 12 may reject the connection request. The bandwidth requirement (or allocation) information may also be used in deciding how many radio packets a particular client 16 needs to wait before starting to transmit its packets to the server 12. Additionally, whenever the channel conditions change, it is possible to increase/ reduce the number of ECC bits to cope with the new channel conditions. Hence, depending on whether the information rate at the source is altered, it may require a dynamic change to the forward and backward bandwidth allocation.

SUMMARY OF THE INVENTION

In one embodiment, a packet header for use in information packets transmitted within a computer network includes a protocol extension field that indicates changes of field values and/or lengths within the header. In one example, the protocol extension field includes two bits. The value of the protocol extension field indicates whether or not the packet header has been altered: 00 indicates no alterations, 01 or 10 indicate a predetermined change in the content and/or length of the header, and 11 indicates dynamic negotiation of the field values and/or size.

In a further embodiment, a communication protocol for a computer network is provided. In this protocol, packets having headers configured to include an indication of whether or not field values and/or lengths thereof have been altered from a preestablished norm are used. The headers include protocol extension fields, the values of which may be used to indicate whether of not the field values and/or lengths have been altered.

In another embodiment, components of a computer network are notified whether field lengths and/or values of packet headers associated with communication packets transmitted between the components have been altered using protocol extension bits included within the headers. The above protocol extension values may be used in this methodology.

These and other features and advantages of the present invention will be apparent from a review of the detailed description and its accompanying drawings that follow.

BRIEF DESCRIPTION OF THE DRAWINGS

The present invention is illustrated by way of example, and not limitation, in the figures of the accompanying drawings in which:

FIG. 3 illustrates a server/client data packet that may be transmitted according to the wireless communication protocol of FIG. 2;

FIG. 4 illustrates a packet header including a protocol extension bit field for use the data packet shown in FIG. 3 in accordance with the present scheme; and FIG. 5 illustrates an example of an extended packet header created using the present protocol extension methods.

DETAILED DESCRIPTION

Figure 1:
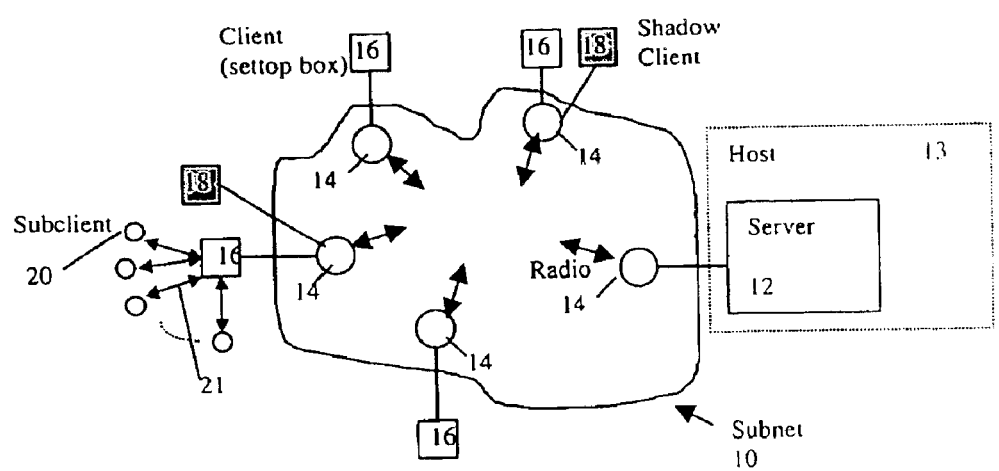
FIG. 1 illustrates a generalized network structure that is supported by a wireless communication protocol.
Figure 2:
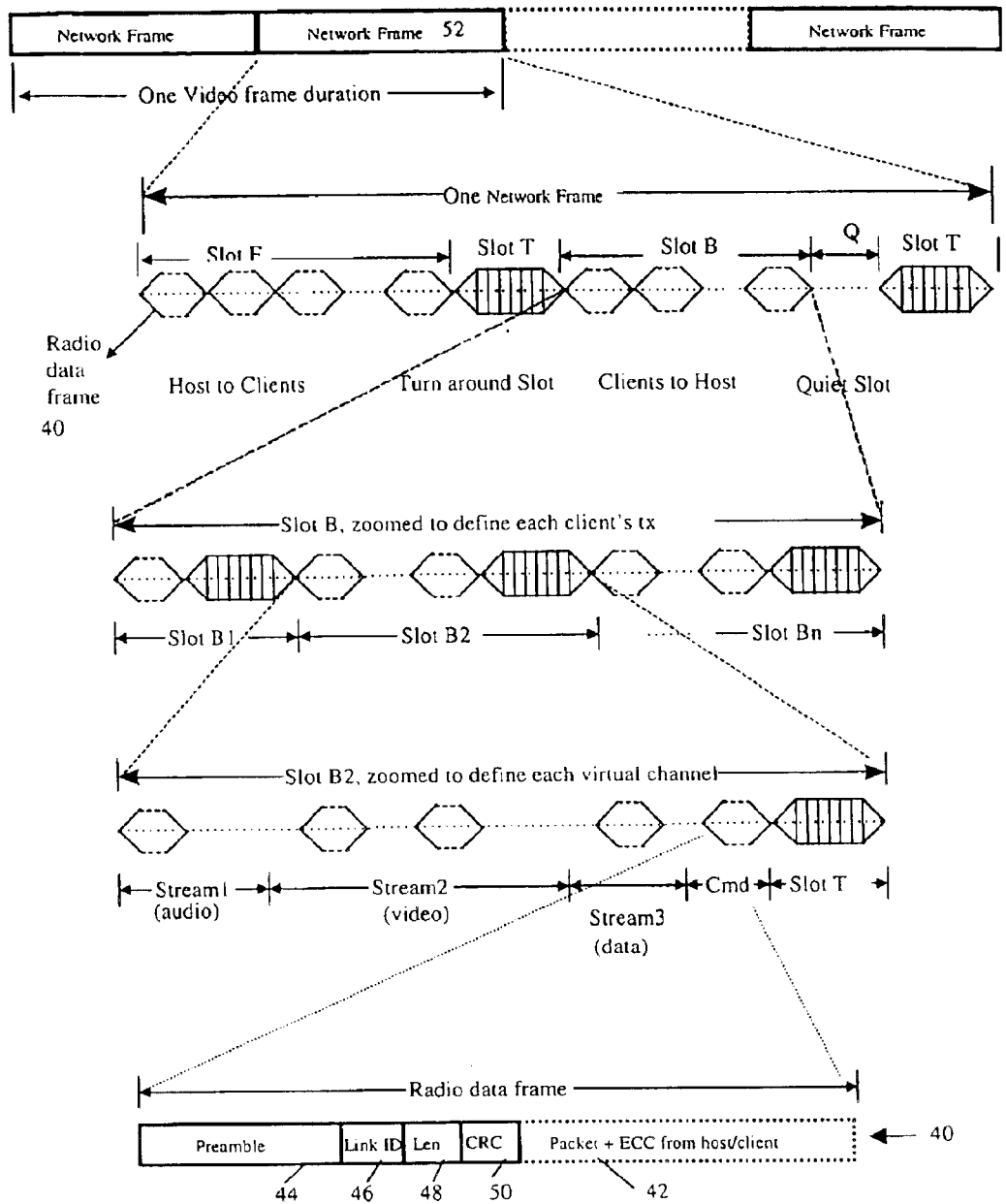
FIG. 2 illustrates the slotted link structure of the wireless communication protocol used within the network shown in FIG. 1.

Described herein is a scheme for extending a communication protocol used within a computer network. In one embodiment, the scheme is implemented using protocol extension bits in headers of packets transmitted within the network. These bits may be used by network devices to negotiate new header formats with both predefined and new fields. In some cases, the packet header fields may be defined and specified, however, using the extension bits the sizes of individual fields may be negotiated during a session to suit the application needs. The use of such extension bits effectively increases the life of a given communication protocol/ architecture, while retaining interoperation with legacy devices. It should be remembered, however, that although the present scheme is discussed with reference to certain embodiments illustrated in the above-mentioned drawings, these methods and apparatus are merely examples of the broader concepts involved with the present invention.

As indicated above and shown more clearly in FIG. 3, server/client data packets 42 have three main parts: a header 60, a payload 62 and an error correction coding (ECC) block 64. In one embodiment, the header 60 is doubleword (DWORD) aligned so that data writes and reads to/from the packet 42 are simplified for hardware implementations. As shown further in FIG. 4, the header 60 may be a specified length and may include a number of fields 66a–66m (e.g., a number of valid fields and a number of reserved fields for future expansion).

Among the packet header fields is a packet type field 66d. The packet type may be represented using a number of bits, for example 4 bits, which allows up to 16 different packet types to be differentiated. Such type identification is useful because of the varying types of information transported within subnet 10. For example, among the supported packet types may be: Audio, Video, Voice, Generic Real Time Data (from input/output devices), Commands to/from clients 16, Commands to/from the host 13, Generic Lossless Non-Real-Time Data, and Network Feature Update packets. The use of packet type field 66d allows the communication protocol to cater to video, audio, command and some low bandwidth data from subclients. Examples of such low bandwidth data include keyboard input, mouse input, joystick input, etc.

Unique to header 60 is the protocol extension (E bits) field 66e, which may be set to a predetermined value (e.g., all ZEROs) by default. As and when a protocol extension is required, for example to either add a new type of service or to extend the length of a certain field in header 60, the E bits can be employed. For example, where two E bits are used, the values 01 and 10 may be used to indicate specific changes in the content and/or length of header 60. The value 11 may then be used for dynamic negotiation of the header content and size.

Dynamic negotiation of packet header size may be accomplished by maintaining packet header content lists at some or all of the devices in the network. For example, two such lists may be employed, with the first list containing all the supported fields in the packet header, their default positions within the header and their default lengths (e.g., in bits). Such a list could be periodically updated as permanent fields are added to or removed from the header. The second list would then be a subset of the first list, containing only those packet header fields supported in the current session, and the actual position and length of those fields.

Now if a client device 16 needs a change in the format of the basic packet header, it may use the E bits to indicate the change. For example, upon logging in to the network, or even during a current session, the client 16 may transmit a command packet 42 that has the E bit field 66e set to a value "00" and request a new packet header format for E=11. For example, the header may have a field not currently being used in the session.

Upon receiving a packet 42 with the E bits set to "00", the network master device may authenticate the new packet header format as one that is supported and then grant the change to the client. This change will be used for packets having E=11 for this client (different clients may use E=11 for different packet header formats). This format should be made known to all the related clients 16 and shadow clients 18, and may also be generally broadcast within the network so that other devices have the opportunity to update their packet header content lists.

While the use of E bits of the type described above offers the possibilities of extending computer network communication protocols, there are some caveats that should be observed with their implementation. For example, the position of E bits 66e within the basic packet header 60 should not be changed. This is because any change in the position of the E bits 66e may cause confusion in the network operations. Further, when the E bits are employed any resulting changes in the packet header format should be consistent throughout all the packets sourced by the corresponding network device(s). In addition, shadow clients 18 will need to adapt to the new packet header format in order to consume the packets from the corresponding client device 16. If there are any disagreements, the disagreeing device may lose the shadow client connection, unless the source device concedes to use only those changes that can be accommodated by all associated shadow clients.

As an example of the use of E bits to dynamically negotiate changes in the packet header format, consider the case where a Client Session ID (CS-ID) field needs to be extended. Ordinarily, as shown in FIG. 6, the CS-ID field of a packet header 60 is divided into Source CD-ID and Destination CS-ID fields 66a and 66b, respectively. The Source CS-ID field 66a may have a predetermined length (e.g., 8 bits) and is regarded as the session ID of the device that originates the payload data carried in the packet 42. Thus, in the cases of a client transmission, the Source CS-ID will be the client's session ID, and so on. The Destination CS-ID field 66b is also a predetermined number of bits (e.g., 8 bits) long and is the session ID of the device for which the packet 42 is destined. Thus, in the case of a client transmission, the Destination CS-ID may be the session ID of the server 12.

Using an 8-bit CS-ID value provides support for 256 simultaneous clients per subnet 10. However, some of the possible CS-ID values may be reserved for various purposes (e.g., special vendor client types, etc.). Thus, the actual number of available CS-ID values for clients may be lower. This may present a problem for very large subnets, if the number of clients to be supported exceeds the available CS-ID values. Thus, in such cases, the E bits can be used to negotiate a different CS-ID field length.

Where the network master device has to extend the CS-ID fields due to an increase in the number of online client devices, it can do it in any of three ways. First, it can renegotiate with all the client devices to use the E bits and extend their CS-IDs by a few bits.

Second, the network master device can move only the devices already using set E bits to the new CS-ID format. In such cases, all the devices using the basic packet header format may, upon receipt of a packet, check the packet's E bits and, if they are set, ignore the packet. Then those devices using the E bits will assume the new length for the CS-1D fields and, hence, the new format for the header. Third, the network master can force a new definition of the basic packet format. The redefinition can also be used to include the expansion of other fields, if no other changes are required. Preferably, where CS-ID fields are expanded due to a large number of online client devices, the network master device will notify all the online clients of these enhancements in accordance with this third option. This will allow the client devices to adjust their packet header formats to accommodate the change while still permitting client devices to use the E bits for other purposes.

An example of renegotiated packet header 70 with extensions 72a and 72b to the Source and Destination CS-ID fields (respectively), a new ECC type field 74, and a new SECurity type field 76 is shown in FIG. 5. The new header 70 and its contents may have been negotiated either with the basic packet header 60 or a pre-negotiated enhanced header that was retrieved from a list. The inclusion of the new fields is signaled through the use of E bits 66*e*. When all the negotiations are complete, both the source and destination devices can agree to extend the header up to the next BYTE or DWORD boundary of the packet 42.

In the example shown in the figure, the Source CS-ID field 66*a* has been expanded using extension field 72*a*. Likewise, the Destination CS-ID field has been expanded using extension field 72*b*. Any of a number of levels of ECC can be specified by the transmitting device using the new ECC type field 74. Further, a security type (e.g., encryption on/off/type) can be specified using the SEC field 76.

Thus, a protocol extension scheme for a computer network has been described. The scheme is very different from the use of "protocol version" fields that are common in existing communication protocols (such as the Internet Protocol), in as much as the present scheme allows for dynamic negotiation of header formats during a session. Thus, although discussed with reference to certain illustrated embodiments, the present invention should not be limited thereby. Instead, the present invention should only be measured in terms of the claims that follow.

What is claimed is:

1. A method of dynamically negotiating a packet header size, comprising:

identifying and maintaining a list of supported fields in a network communications packet header, the list listing at least default positions and default lengths of the supported fields;

identifying and maintaining another list of packet header fields utilized in a current session for network communications between a master device and a client device, the list listing at least actual positions and actual lengths of the utilized packet header fields; and dynamically negotiating, between the master device and the client device, through use of extension bits and the lists, changes in at least one supported field of the utilized packet header of the current session due to demands in a network communication between the master device and the client device.

2. The method according to claim 1, wherein dynamically negotiating comprises:

receiving a request from the client device at the master device requesting a change in the utilized packet header;

confirming with the master device from the list of supported fields that the requested change is allowed; and granting with the master device the requested change in the packet header for the current session for communications between the master device and the client device.

3. The method according to claim 2, wherein the change in packet header is implemented for the packet headers for selected packets being communicated between the master device and the client device having the extension bits being set to selected values.

4. The method according to claim 2, wherein the change in packet header is further utilized for communications between the master device and network devices related to the client device.

5. The method according to claim 1, wherein dynamically negotiating comprises negotiating to extend at least one field of the packet header of the current session.

6. The method according to claim 5, wherein the field of the packet header extended is a client session identification field.

7. The method according to claim 1, wherein dynamically negotiating further comprises:

communicating between the master device and the client device with the changed packet header for packets utilizing the extended bits of a selected value; and communicating between the master device and another client device using the current utilized packet header.

8. The method according to claim 7, wherein the changed packet header includes a changed client session identification field.

9. The method according to claim 1, wherein dynamically negotiating further comprises re-defining, with the master device, a new difinitional format of a basic packet format for the client device.

10. The method according to claim 9, wherein in response to client session identification field format being expanded, notifying the client devices of the new definitional format for the basic packet format.

11. A network system for dynamically negotiating a packet header size, comprising:

a master device;

client devices in communication with the master device;

a list of supported fields in a network packet header including at least default positions and default lengths of the supported fields;

another list of packet header fields supported for a current session with actual positions and actual lengths of the packet header fields; and wherein the master device dynamically negotiates through use of extended bits and the lists changes in the supported fields of the packet header for the current session due to demands in the network communication between the master device and the client devices.

12. The network system according to claim 11, wherein the master device re-negotiates with the client devices to extend a field of the packet header.

13. The network system according to claim 12, wherein the extended field of the packet header is a client session identification field.

14. The network system according to claim 11, wherein:

the master device communicates with selected client devices communicating with the extended bits set to selected values utilizing a new field format; and the master device maintains communications with other client devices utilizing a current field format.

15. The network system according to claim 14, wherein the new field format is a client session identification field format.

16. The network system according to claim 14, wherein the master devices re-define a new definitional format of a basic packet format for the client devices communicating with the extension bits set to the selected values.

17. The network system according to claim 16, wherein the master device, in response to client session identification field format being expanded, notifies the client devices of the new definitional format for the basic packet format.

* * * * *

UNITED STATES PATENT AND TRADEMARK OFFICE
CERTIFICATE OF CORRECTION

PATENT NO. : 6,888,818 B1
DATED : May 3, 2005
INVENTOR(S) : Rajugopal R. Gubbi

It is certified that error appears in the above-identified patent and that said Letters Patent is hereby corrected as shown below:

Column 2,
Line 66, the "D" between "preferred" and "over" should be deleted;

Column 3,
Line 37, "radios" should be -- radios' --;

Column 6,
Line 54, "CS-1D" should be -- CS-ID --;

Column 8,
Line 13, "current" should be -- currently --;
Line 19, "difinitional" should be -- definitional --.

Signed and Sealed this

Thirtieth Day of August, 2005

JON W. DUDAS
*Director of the United States Patent and Trademark Office*